(12) United States Patent
Grall et al.

(10) Patent No.: US 6,456,565 B1
(45) Date of Patent: Sep. 24, 2002

(54) SYSTEM FOR UNDERSEA SEISMIC PROSPECTING

(75) Inventors: Georges Grall, Biot; Gilles Moresco, Le Cannet, both of (FR)

(73) Assignee: Thomson Marconi Sonar S.A.S., Sophia Antipolis (FR)

( * ) Notice: Subject to any disclaimer, the term of this patent is extended or adjusted under 35 U.S.C. 154(b) by 55 days.

(21) Appl. No.: 09/594,088

(22) Filed: Jun. 15, 2000

(30) Foreign Application Priority Data

Jun. 22, 1999 (FR) ............................................. 99 07959

(51) Int. Cl.7 ................................................. G01V 1/38
(52) U.S. Cl. ............................... 367/18; 367/17; 367/20
(58) Field of Search ............................... 367/15, 16, 17, 367/18, 19, 20, 133, 171, 172; 181/5

(56) References Cited

U.S. PATENT DOCUMENTS

| | | |
|---|---|---|
| 3,425,506 A | 2/1969 | Evans |
| 4,234,939 A | 11/1980 | Grall |
| 4,510,586 A | 4/1985 | Grall et al. |
| 4,596,007 A | 6/1986 | Grall et al. |
| 4,745,583 A | 5/1988 | Motal |
| 4,762,208 A | 8/1988 | Reynier et al. |
| 4,779,239 A | 10/1988 | Grall |
| 4,794,574 A | 12/1988 | Grall |
| 4,951,268 A | 8/1990 | Grall |
| 5,058,081 A | 10/1991 | Gulli et al. |
| 5,058,082 A | 10/1991 | Bertheas et al. |
| 5,365,491 A | 11/1994 | Sullivan et al. |
| 5,790,472 A | 8/1998 | Workman et al. |
| 5,856,954 A | 1/1999 | Grall |
| 5,902,430 A | 5/1999 | Carpenter et al. |
| 6,002,647 A | 12/1999 | Grall |

FOREIGN PATENT DOCUMENTS

EP 0 375 118 6/1990

*Primary Examiner*—Edward Lefkowitz
*Assistant Examiner*—Anthony Gutierrez
(74) *Attorney, Agent, or Firm*—Oblon, Spivak, McClelland, Maier & Neustadt, P.C.

(57) ABSTRACT

A system for underwater seismic prospecting or exploration on seafloors, especially deep seafloors, including streamers designed to contain the measurement devices and to lie on the seafloor, in the form of an inner tube that is non-stretching and non-compressible and an outer tube that is extensible to a certain extent. Through the injection of liquid between these two tubes, the buoyancy of each streamers is made positive. This enables it to be detached from the seafloor and towed to the next measuring position.

11 Claims, 6 Drawing Sheets

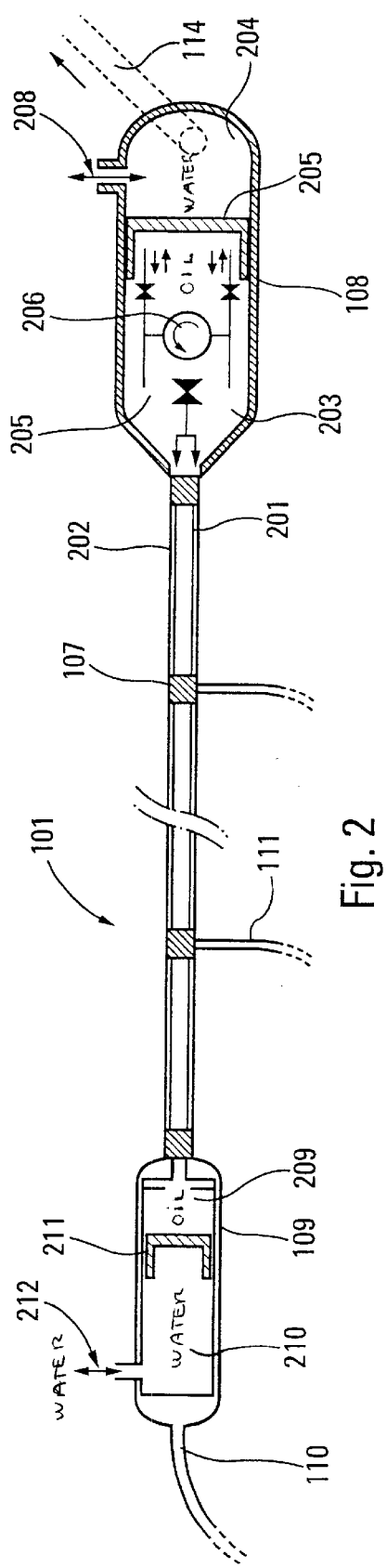
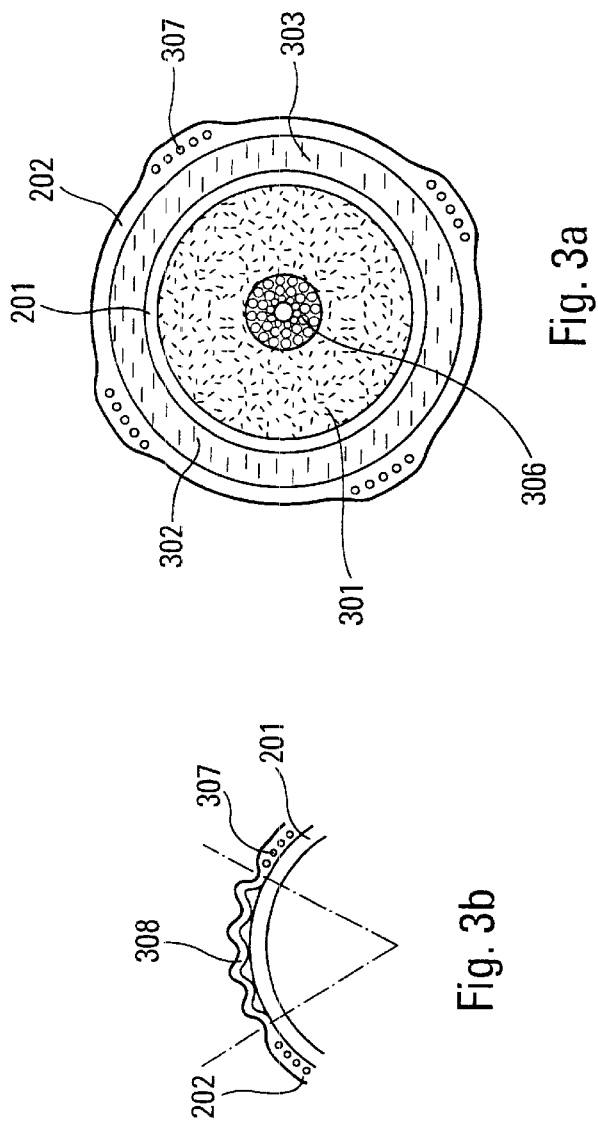
Fig. 2
Fig. 3a
Fig. 3b

SYSTEM FOR UNDERSEA SEISMIC PROSPECTING

BACKGROUND OF THE INVENTION

1. Field of the Invention

The present invention relates to systems that can be used to carry out underwater seismic prospecting or exploration, especially when the seafloor is at a great depth. The system of the invention can be used especially to detect the presence of petroleum in ocean beds.

2. Description of the Prior Art

There are known ways of seismic prospecting for petroleum on the seafloor or seafloor using techniques derived from those used in onshore seismic prospecting for petroleum. The differences relate essentially to the excitation means used to obtain the necessary acoustic waves as well as the means used to position the acoustic sensors in the face of the difficulties caused by the great depth of water which, unlike in onshore prospecting, does not allow for the manual positioning of these elements at the required positions.

It becomes necessary in this case to fixedly attach the acoustic sensors, which are geophones or hydrophones for example, to very long cables that are towed behind a boat and submerged at suitable places to make the necessary measurements. In practice, cables having lengths of several kilometers are used. They are placed parallel to each other with a specified distance between them.

At present, for relatively shallow seafloors, with depths of about 200 meters, these cables are submerged by being reeled out behind the towing boat. When the measurements have been completed at one place, they are raised to the surface and moved further away. The operations of raising and sinking the cables entail idle times between the series of measurements. These idle times are prohibitively costly for depths of over 200 m. Furthermore, there is a series of technical problems, already present at the shallow depths, that becomes excessive at great depths. Since the precision required for positioning the sensors, and hence the cables, on the seafloor in relation to the theoretical grid of values stipulated for accurate measurements is in the range of ±20 m for submersion depths of up to 3000 m, it is easy to imagine the difficulty of obtaining such precision, given the drifts that the cable undergoes when it sinks towards the seafloor.

It is also necessary to obtain a renewable coupling of the geophones with the seafloor, whatever its nature and relief. The greater the depth, the more limited is the knowledge of these parameters and the more difficult is it difficult to handle the cable in order to adapt to it.

The rise in productivity as well as in the quality of the images restituted from the measurements are leading to the parallel use of several cables to obtain 3D images. In this case, the relative positioning of these cables increases the constraints on the individual positioning of each of the cables.

As already stated above, it soon becomes necessary to be able to rapidly and safely shift the cable between two series of measurements without having to raise and then sink them again.

SUMMARY OF THE INVENTION

To enable a maneuver of this kind, the invention proposes a system of undersea seismic prospecting especially for seafloors of the type comprising at least one measurement streamer provided at its head with a diving vehicle and, at its tail, with an inert float wherein chiefly the streamer is formed by a non-stretching and non-compressible inner tube and an outer tube that is coaxial with the inner tube and radially extensible, wherein the system comprises means to inject a liquid into the space between these two tubes so as to enable the setting of the buoyancy of the streamer between a negative value at which it lies on the seafloor and a positive value at which it floats above the seafloor so that it can be shifted one measurement position to another.

According to another characteristic, the inert tail float communicates with the streamer so that it receives a part of the liquid injected into it in order to modify its buoyancy in the same way as that of the streamer.

According to another characteristic, the interior of the tail float is divided into two compartments separated by a floating piston, a first compartment into which the liquid coming from the streamer penetrates and a second compartment linked to the depths of the sea to ensure the balance of the pressures.

According to another characteristic, the diver vehicle comprises a container of liquid and means to inject the liquid into the streamer and retrieve it.

According to another characteristic, the interior of the diver vehicle is divided into two compartments separated by a floating piston, a first compartment comprising the liquid designed to be injected into the streamer and a second compartment linked to the depths of the sea to provide for the balance of the pressures.

According to another characteristic, the streamer and the tail float are provided with guide ropes used to maintain the altitude of the assembly at a specified value above the seafloor when their buoyancy has become positive following the injection of the liquid.

According to another characteristic, the vehicle comprises means of navigation to make it maneuver in a horizontal plane so as to adjust the offset of the streamer with respect to the towing axis of the towing boat of the assembly.

According to another characteristic, these means of navigation comprise at least one propeller located in a cross-tunnel opening out on each of the lateral flanks of the diver vehicle.

According to another characteristic, the means of navigation comprise a set of streamers designed to be towed in parallel and measurement means to determine the spacing between these streamers and control the navigation means of the diver vehicle accordingly.

According to another characteristic, the diver vehicle is provided with a keel enabling it to get firmly anchored to the seafloor.

According to another characteristic, the modules are high-density modules and enable strong mechanical coupling with the seafloor.

BRIEF DESCRIPTION OF THE DRAWINGS

Other features and advantages of the invention shall appear clearly from the following description, given by way of a non-restrictive example, with reference to the appended figures, of which:

FIG. 2 shows a simplified longitudinal sectional view of a cable according to the invention;

FIGS. 3a and 3b show cross-sectional views of this cable;

MORE DETAILED DESCRIPTION

Figure 1:
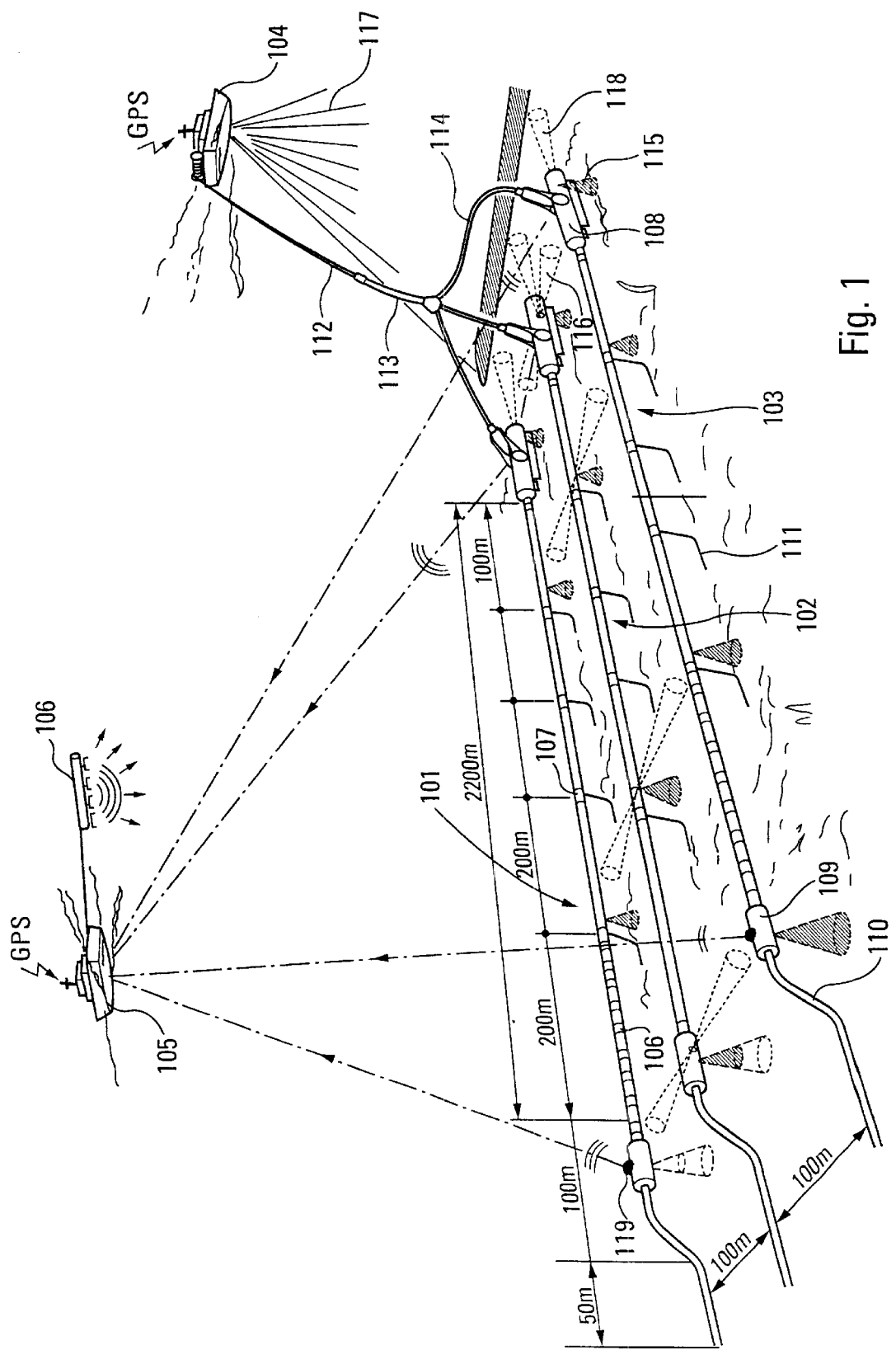
FIG. 1 gives a view in cavalier perspective of a full underwater seismic exploration system comprising three parallel towed cables.

The system of seismic prospecting shown in FIG. 1 comprises three seismic prospection cables 101 to 103 known as streamers towed in this figure by a towing boat 104, in parallel above the seafloor at an altitude of about 10 to 20 meters.

For example, these streamers have a length of about 2 km, are separated from one another by about 100 m and have sensors spaced out by about 25 m. The goal sought is to limit the idle time between two series of measurements to one or two hours.

A second boat 105 that cruises above the assembly sends acoustic waves to sound the seafloor by means of a device 106 towed behind this boat. This device may be of the type known as an air gun. To facilitate the explanation, the second boat is shown in FIG. 1 in an operating position which shall be the position that it would occupy if the streamers shown herein in transit were lying on the seafloor. Each streamer consists of ten active sections with a length of about 200 m comprising evenly spaced-out sensors 106 connected by junctions 107.

Each streamer has a diver vehicle 108 at the head used to tow it from the towing boat 104. The streamer also has an inert tail float 109 that prevents it from trailing on the seafloor and, at the same time, keeps it at the desired height above the seafloor by means of a guide rope 110. A set of guide ropes 111 respectively fixed to the junctions 107 keeps the entire streamer at this same altitude, given the characteristic floating means of the invention which shall be described here below.

The diver vehicles 108 are towed from the towing boat 104 by means of a heavy cable 112 followed by a light cable 113 and three leashes 114 connecting this light cable to the vehicles 108.

The vehicles 108 and the inert floats 109 each have a sounding machine 115 through which their height above the seafloor can be known.

The diver vehicle and the inert float of the central streamer furthermore each have a horizontal sounding machine 116 used as a distance measurement device to ascertain the relative position of three streamers with respect to each other. The measurement of these different sounding machines is transferred to the towing boat 104 by means of towing cables so that corrective steps can be taken by means of the devices described here below.

The towing boat 104 determines its position absolutely by GPS type means. It also has a multiple-beam sounding machine 117 used to map the seafloor in front of the towed streamers in order to find out the relief and for example and raise the streamers to a greater height in order to prevent them from striking obstacles that come up before the diver vehicles. These vehicles may also comprise front sounding machines 118 that advantageously complement the action of the multiple-beam sounding machine 117.

Finally, the diver vehicles and the inert floats located at the four corners of the assembly comprise acoustic transmitters 119 or pingers by which the boat 105 can determine its relative position with respect to the submerged assembly. The absolute position of this boat is also determined by GPS type elements. If necessary, it is possible, for the sake of redundancy, to provide the central streamer with a system of pingers.

According to the invention, the assembly comprises means used to modify the buoyancy of the streamers proper and of the inert tail floats so that this buoyancy is, firstly, negative during the measurements, thus enabling the streamers to lie on the seafloor and, secondly, positive during the shifting of these streamers between two measurement points, thus enabling them to navigate above the seafloor at a determined altitude by means of the guide ropes 111 and 110. This action is done by transferring a liquid with a density lower than that of sea water between the diver vehicles 108 on the one hand and the body of the streamer as well as the inert tail float on the other. Naturally, the buoyancy of the assembly including the diver vehicle is constant and slightly negative and the raising of the diver vehicle up to the height of the rest of the streamer is obtained by traction from the towing boat 104.

Figure 4:
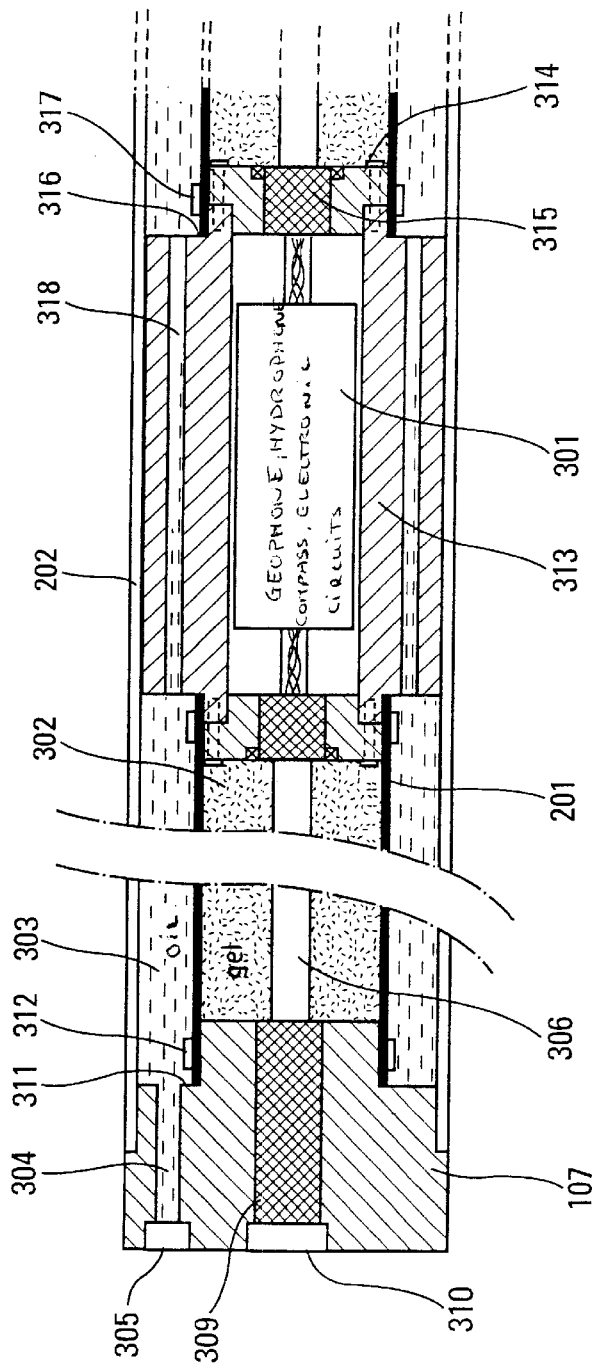
FIG. 4 shows a detailed longitudinal sectional view of a cable portion.

To obtain this effect, a system of the kind shown in FIGS. 2 to 4 is used.

The sections of the streamer are formed by two coaxial tubes 201 and 202. The inner tube 201 is non-extensible while the outer tube 202 is radially extensible.

The inner tube 201 contains the different acoustic measurement units 301 and the free volume is filled with a filler product 302 such as oil or preferably a gel that enables it to resist pressure without undergoing any appreciable variable in volume. The interior of the diver vehicle 108 is divided into two volumes 203 and 204 separated by a sliding piston 205. The volume 203 is filled with a liquid 303 having a density lower than that of water. This is a liquid known in the prior art for filling the devices of this type, oil for example. A pump 206 associated with solenoid valves such as 207 is used to transfer this liquid into the space between the outer tube 202 and the inner tube 201 and conversely to remove the liquid from this space and send it into the volume 203. During these operations, the piston 205 slides to adapt the volume of the cavity 203 as a function of the quantity of oil transferred. The cavity 204 for its part is connected to the sea by an aperture 208 which keeps the cavity always filled with sea water in order to prevent stresses due to the pressure on the structure of the vehicle 108.

The oil thus injected between the two tubes inflates the outer tube thus increasing the buoyancy of the streamer proper. This oil spreads from one section to another of the streamer, crossing the junctions 107 by means of a conduit 304 provided with a hydraulic connector 305 that enables the assembling and disassembling of these junctions.

The interior of the inert float 109 located at the rear end of the streamer is itself divided into two cavities 209 and 210 separated by a floating piston 211. The oil reaching the terminal junction of the last section of the streamer penetrates the cavity 209 and pushes the piston 211 to the bottom of the cavity 210. This cavity 210 is filled with sea water by means of a hole 21 through which the cavity is drained and filled when the piston moves.

When the cavity 209 gets filled with oil, the buoyancy of the float 209 increases and it can then navigate above the surface of the sea at an attitude that is determined by the filling and the action of the guide rope 110.

It will be noted that the assembly consisting of the diver vehicle, the streamer and the inert float retain constant buoyancy since this buoyancy comes from the oil whose volume itself is constant. There is simply a transfer of a part of the buoyancy from the diver vehicle 108 to the streamer 101 and the inert float 109. When the buoyancy values of the streamer and inert float are positive, they can rise above the surface of the sea and be kept at a suitable height above the sea surface by the guide ropes 111 and 110 so that they can be shifted above the surface. The negative buoyancy of the towing boat, which has increased since it has lost a part of its oil, is compensated for by the traction from the towing boat 104. This traction and hence the tugging speed are adjusted so that, depending on the different parameters, especially the weight of the heavy cable 112, the altitude of the diver vehicle is substantially the same as that of the streamer and the inert float.

It will also be noted that the entire system is in a state of completely equalized pressure, enabling work at any depth of submersion.

FIG. 3a shows a cross-section of a section of the streamer in a completely inflated position and FIG. 3b shows a portion of the same section deflated and limited to an extension zone.

The inner tube 201 has a structure with high radial resistance and high flexibility, similar to that of a shower pipe, in order to prevent it from being crushed when it is wound on a winch after being lifted aboard the towing boat. It is filled as described further above with a product designed to provide resistance to pressure. This product will preferably be a gel known in the prior art but it could also be an oil itself known in the prior art. The center of this tube is crossed by a "core" 306 formed by a set of electrical cables designed to power the sensors distributed along the streamer and collect the signals generated by these same sensors.

The outer tube 202 is formed by a flexible skin made with a material having high tear resistance and abrasion resistance, for example a material like Vectran. It is reinforced according to a known technique, by means of longitudinal stress-compensating cables 307 formed by material having tensile strength, for example Kevlar.

When the pump 206 extracts the oil contained between the tubes 201 and 202, the outer tube 202 shrinks under the effect of the external pressure of sea water. The portions of this tube included between the areas where the stress-compensating cables 307 are located then get folded as in a concertina to form ripples 308. When all the oil has been pumped out, apart from a small residual quantity in the hollows of the ripples 304, the skin forming the outer tube rests on the external surface of the inner tube 201.

In this situation, the buoyancy of the streamer is slightly negative. Thus, it lies on the seafloor exerting sufficient pressure on it to provide for the most efficient possible coupling of the different sensors, especially the geophones, with the seafloor. Besides, the structure and composition of the sheath 202 are such that when the inflation is done, this outer tube becomes non-stretchable and the volume of the streamer can then no longer undergo vary. This prevents the phenomena of instability of navigation, known especially as "free surface" phenomena arising out of differential variations of submersion that may appear when this volume varies.

In practice, it is easy to obtain a variation in diameter of 10%, which gives the desired results.

In addition to the hydraulic connector used for the circulation of oil from one section of the streamer to another through the junctions, each of them also has an electrical insert 309 connected to the core 306. This insert is provided with an electrical connector 310 used to set up the link with the junction of the adjacent section.

Each junction has a shoulder 311 to which the inner tube 201 is fixed for example by means of a clamp 312.

The electrical modules 301 which are evenly distributed along the streamer, comprise for example a geophone, a hydrophone, a compass and the electronic circuits associated with these elements. These instruments are placed in a metal casing 313 that takes up the entire section of the streamer. This casing is closed by two hawse units 314 each comprising an electrical insert connected to the electrical core 306. Each hawse unit forms, with the casing, a shoulder 316 to which the inner tube is fixed by means for example of a clamp 317. The peripheral part of the casing is drilled with several channels 318 to allow for the flow of inflating oil. These modules are high-density modules to enable strong mechanical coupling with the seafloor.

Figure 5:
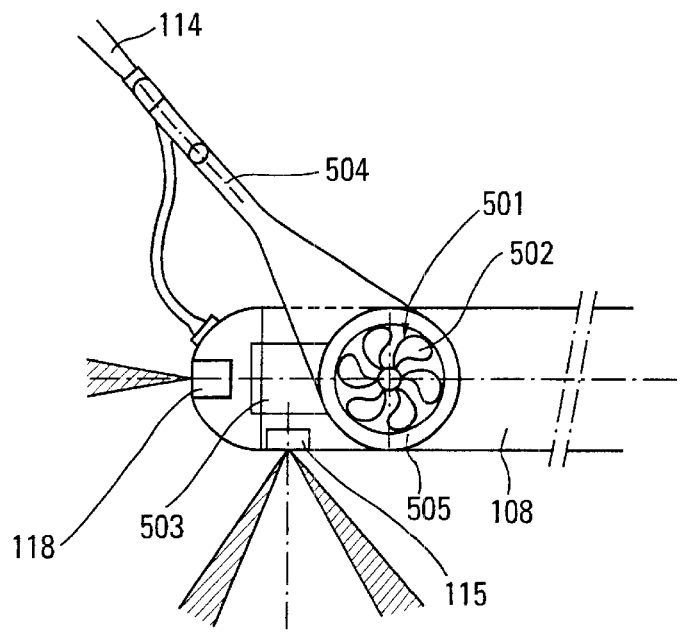
FIG. 5 shows a side view of the diver vehicle at the head of the cable.

FIG. 5 gives a partial schematic view of the diver vehicle 108 showing that it is provided with a propeller unit to move it laterally and maintain the requisite distance between the different streamers while these elements are being moved.

For this purpose, the vehicle 108 has a horizontal cross-tunnel 501 opening out on the two sides of its shell. Counter-rotating propellers 502 driven by a motor 503 are installed in this tunnel. This motor is powered from the towing boat 104 by means of different towing cables.

To hold the horizontal position of this propeller assembly as efficiently as possible, the stress compensation from the leash 114 that terminates the set of towing is obtained by means of a clamp 504 that grips the body of the vehicle while being fixed to its side so that its pivoting pin coincides with the rotational axis of the propellers 502. In the example shown in the figure, this pivoting is obtained by means of a big ring 505 that surrounds the outlet holes of the tunnel 501. It is also possible to use a central hinge on the shaft of the propellers which would then extend beyond the flanks of the vehicle.

In the example corresponding to FIG. 1, the commands activating the motor 503 are generated by means of lateral sounding machines 116 carried by the diver vehicle of the central streamer. These commands are passed on to the motors of the side towing boats by means of the leashes 114.

Figure 6:
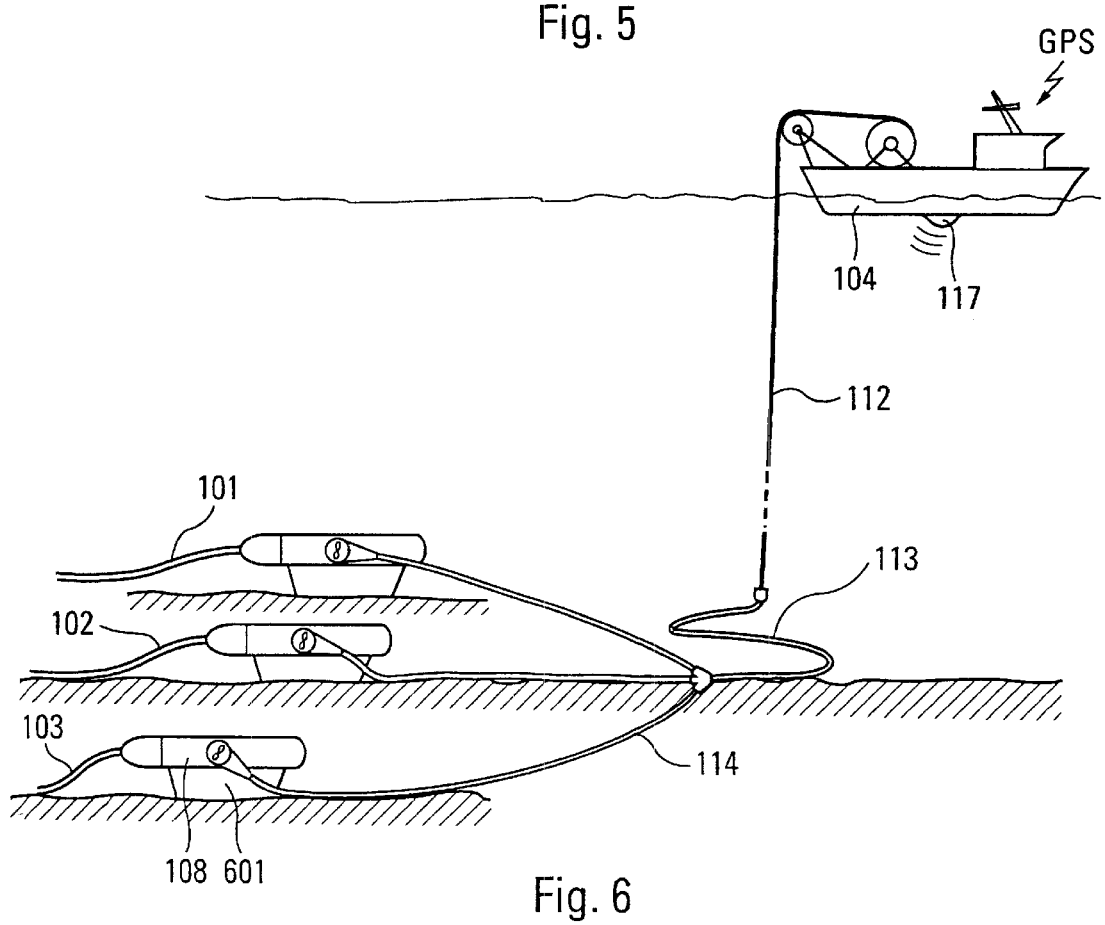
FIG. 6 shows a view in cavalier perspective of the towing boat, the towing cable and the heads of three cables according to the invention.

The rigging used to tow all the streamers, three in this example, has been shown in FIG. 6 in a position where the streamers lie on the seafloor and where the towing boat has stopped.

This rigging comprises first of all a heavy cable 112 that is reeled out from the boat 104. This heavy cable whose length varies for example from 500 to 3000 m depending on operational requirements, is designed so that it can carry and tow all three units constituting the "diver vehicle/streamer/inert float", and give all the power needed for the side propellers, for example 20 kW, the oil circulation pumps, for example 3 kW, and the electronic devices contained in the measuring modules, for example 3 kW. It is also used to send control signals to the diver vehicles and measurement signals to the boat along with information from the different sensors such as the sounding machines and the devices for identifying the position of the streamers.

This heavy cable 112 is followed by a neutral cable 113 about 200 m long for example. This cable provides for limited mechanical decoupling between the devices laid on the seafloor, permitting various motions such as heaving, pitching, and lateral and longitudinal shifts to which the surface boat is subjected even when it uses a dynamic anchoring system. This decoupling thus makes it possible to prevent the vehicles 108 and/or their leashes 114 from being carried along. It is thus possible to avoid the use, on board the boat, of an anti-heaving system which is complicated and costly to use.

This neutral cable also reduces any noise, in the seismic band, that would inevitably be generated if the heavy cable lying on the seafloor were to subjected to a tug from the motions of the boat.

The neutral cable is finally followed by three leashes 114 that diverge to get hooked to the vehicle 108. These leashes are of the same type as the heavy cable but have a smaller diameter. Apart from the function of towing the vehicles, these leashes support the anchoring of the vehicles when they are laid on the seafloor during the data acquisition periods because, although they always have negative buoyancy, they are at the minimum of this buoyancy since they are filled with oil that have been drained from the streamers.

As an improvement, the invention also proposes to provide the vehicles 108 with a keel 601 that gets attached to the seafloor under the effect of the weight of the vehicle. This keel is designed to make it even more certain that the vehicle will remain immobile.

Figure 7:
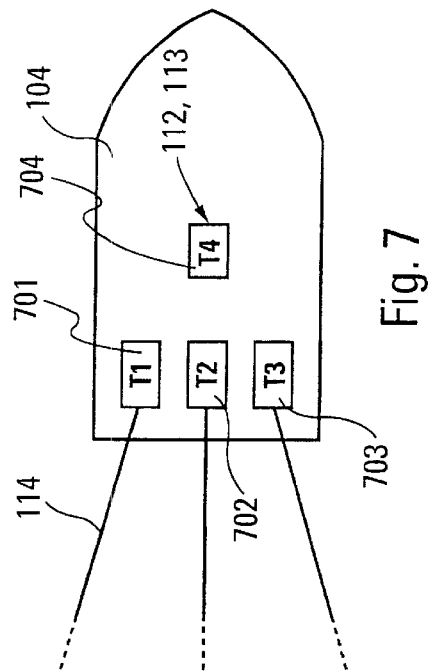
FIG. 7 shows a top view of the towing boat.

To make it easier to put the three streamers into water, they are wound on the bridge of the towing boat 104 on three distinct winches T1 701, T2 702 and T3 703 aligned side by side across the rear of this boat, as shown in FIG. 7. The heavy cable 112 and the light cable 113 for their part are wound on a fourth winch T4 704 located well behind the winch T2.

To put the entire system into water, first of all the streamer wound on one of the side winches, T1 for example, is unwound and allowed to float on the surface of the sea behind the boat 104 which moves forward at a speed that is high enough for this purpose. When it is entirely unwound, its diver vehicle and then its leash are connected, and then its bundle and the entire unit is let out, the speed of the boat being then set at 2 knots.

Then, the operation of the side propeller device of this diver vehicle is activated to make it move away, along with the streamer attached to it, by about 100 m from the axis of the boat 104.

These operations are started again with the streamer wound on the winch T3, the unit being made to move away on the other side of the axis of the boat with respect to the first streamer. These two streamers then navigate in parallel on the surface of the sea and are separated by about 200 m.

The third streamer is then deployed from the winch T2 in a "straight-tailed" position to use an expression, namely without any divergence from the axis.

All that remains to be done then is to connect the leashes of the three streamers to the end of the light cable 113 and then unwind the unit from this cable and from the heavy cable.

It is then possible to carry out the operations of submerging and lifting this unit as shall be described further below for an isolated streamer.

The recovery of the towed cable and three streamers will be done at the end of the operations in reverse to the steps performed to place this unit in water.

FIGS. 8a to 8f show the different phases of the implementation of a system according to the invention. In order to simplify the explanations, the description is limited to the case of a single streamer.

Figures 8A, 8B:
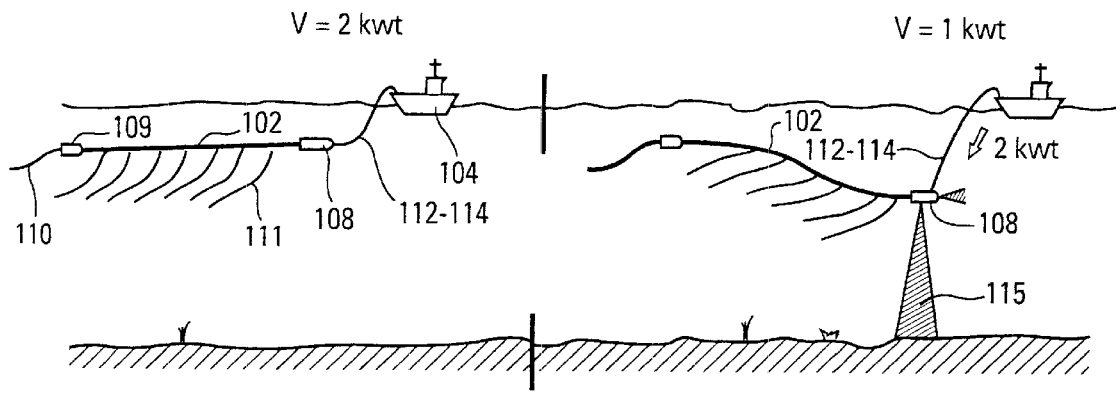
FIGS. 8a to 8f show a schematic view of the series of steps for submerging the cables and shifting them above the seafloor.

The streamer is put into water according to the method described here above. The towing boat 104 moves at a speed of 2 knots with respect to the water. When the unit has been fully deployed and the electrical connections have been made, the buoyancy of the streamer is adjusted to a neutral value and the diver vehicle is made to submerge to a depth of 10 to 15 m as shown in FIG. 8a. The towing boat then follows a homing path up to the location provided for the seismic measurements.

Shortly before arrival at this position, the towing cable 112–114 is let out so that its weight as well as that of the diver vehicle leads to the descent of this vehicle which itself leads to the descent of the streamer 102 as shown in FIG. 8b. So as to be able to maintain the tension of the streamer 102 and, at the same time, minimize the diving time, the speed of descent and the towing speed are adjusted simultaneously so that the horizontal speed of the streamer is substantially equal to 1 knot and its vertical speed is substantially equal to 2 knots. The altitude of the diver vehicle 108 with respect to the seafloor is constantly tested by means of the sounding machine 115 carried by it.

When the diver vehicle reaches its cruising height above the seafloor, this height being measured by the sounding machine 115, the guide ropes 111 and 110 of the streamer and the inert diver touch the seafloor in stabilizing the cruising height. Under the effect of being drawn by the boat, they trail along the seafloor as shown in FIG. 8c, thus ensuring the straightness of the streamer even it is being drawn at very low speed, for example at 1 to 2 knots in relation to the water.

Figures 8C, 8D:
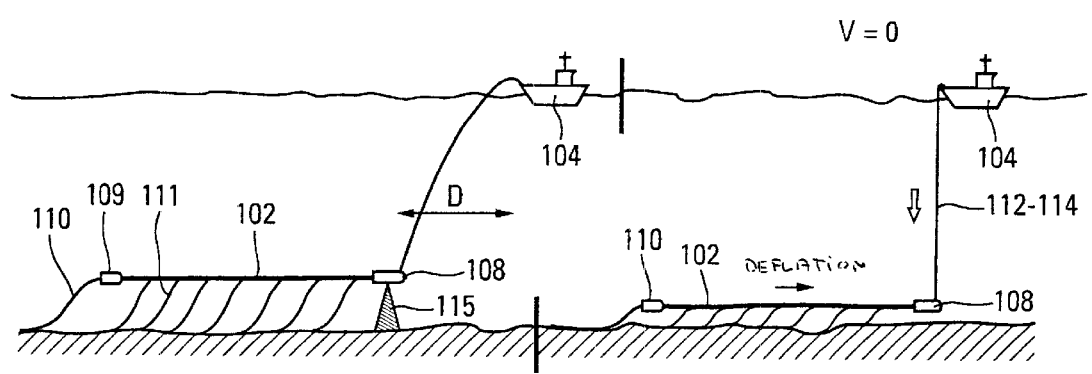

When the towing boat 104 reaches the measuring position, as shown in FIG. 8d, it is stopped and stabilized with respect to the seafloor by means of a known system of dynamic anchoring.

Under the effect of their weight, the cable 112–114 and the diver vehicle 108 continue to move until the cable is vertical thus cancelling the initial offset distance d between the towing vehicle and the boat. Simultaneously, the deflation of the streamer is begun. The steamer approaches the seafloor as well as the diver vehicle and the inert float. The guide ropes then provide for the anchoring and tension of the streamer.

Figures 8E, 8F:
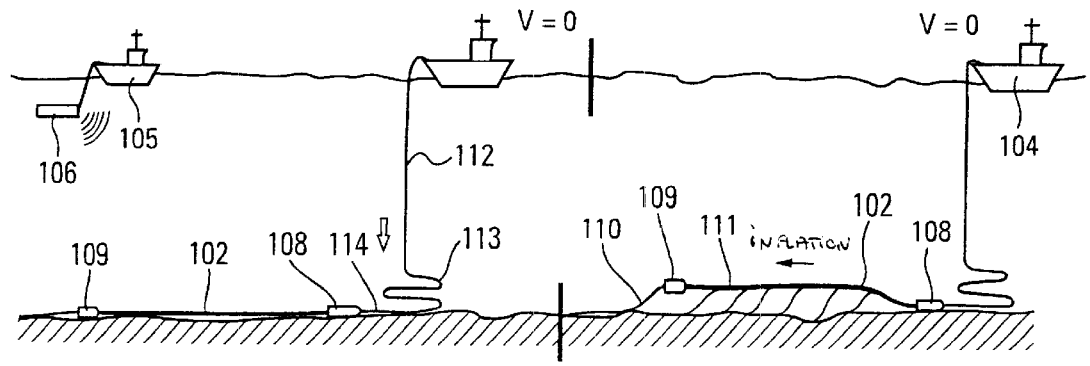

When the streamer is in position, as shown in FIG. 8e, while the deflation is continued, an additional part of the heavy cable 112 is paid out so that the leash 114 lies on the seafloor thus anchoring the towing vehicle 114 as described further above. The light cable 113 for its part floats between the downline end of the cable 112 and the upline end of the leash 114. When the streamer has been entirely deflated, the electronic modules contained in the streamer are properly coupled with the seafloor. It is then possible, after calibrating the position of all the sensors in these modules, to start sending seismic signals from the air guns 106 towed by the second boat 105.

At the end of this series of measurements, in order that the streamer can be moved above the seafloor up to its next measuring position, it is inflated by having the oil from the diver vehicle 108 pushed back into the space between the two tubes constituting the streamer as well as into the inert float 109. The pumping is stopped when a sufficient positive buoyancy has been obtained to detach the body of the streamer and the inert float from the bottom of the sea, these units being allowed to float at an appropriate altitude, limited by the guide ropes, as shown in FIG. 8f. The towing boat 104 is then put into operation possibly by the winching, if necessary, of a certain length of the heavy cable so that, under the effect of the weight of this heavy cable 112 and the speed at which the boat is advancing, the towing vehicle 108 gets detached from the seafloor and then draws the streamer forwards, stabilizing its altitude at the same height as that of the body of the streamer. There is a return to the conditions of FIG. 8c. It is thus possible then to move the unit at a speed of about 2 knots per 2000 m of seafloor. This enables a reduction in the transit time between two measurement positions to a value of about 1 hour which is a considerable improvement over the methods used earlier.

When the following measurement position is reached, the operations as shown in FIGS. 8d to 8f are started again.

Figure 9:
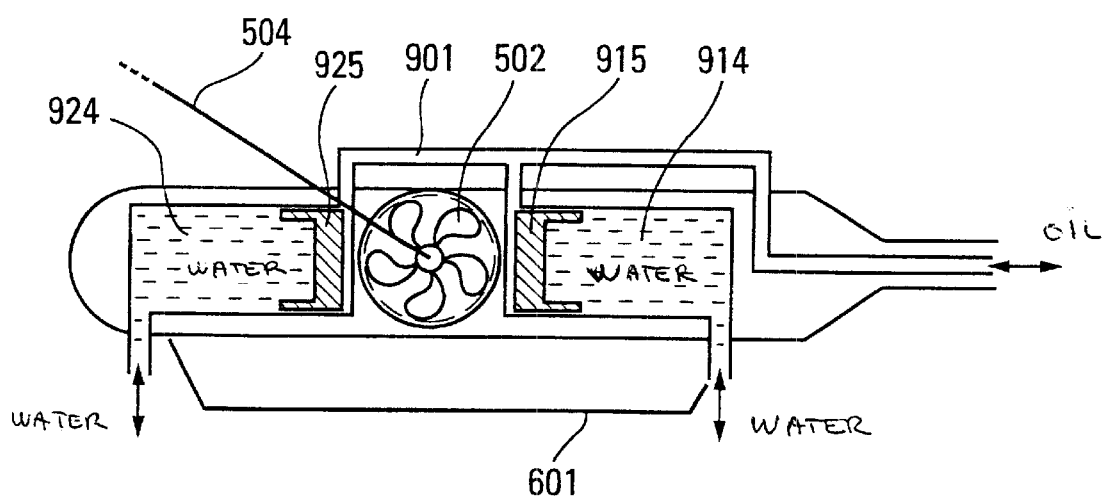
FIG. 9 shows a longitudinal sectional view of an alternative diver vehicle.

As a variant, the invention also proposes the making of the towing vehicle in the manner shown in FIG. 9 wherein the oil/water container is made in two symmetrical parts with respect to the center of the vehicle, corresponding substantially to its center of gravity at the fastening point of the clamp 504 and the rotational axis of the propellers 502. There are thus two containers 914 and 924 and two pistons 915 and 925 that shift symmetrically with respect to the center. Thus a greater equilibrium of the towing vehicle is obtained. The oil-filled parts are joined by a tube 901.

As a numerical example, for a streamer with a length of 2 km provided with an inert tail float having a volume of 230 l, it is necessary to use 2260 l of oil having a density equal to 0.7. The thickness of the layer of oil when the filling is the maximum between the two tubes forming the streamer is substantially equal to 4 mm. To then make it possible to inflate or deflate the streamer in a time of 30 seconds, the delivery rate of the pump will be substantially equal to 1.25 l per second. This is quite a reasonable value given the equipment that can be used in this case.

What is claimed is:

1. A system of undersea seismic prospecting for seafloors of the type comprising at least one measurement streamer provided at its head with a diver vehicle and, at its tail, with an inert float, and comprising means for the injection of a buoyancy liquid into containers integrated into the streamer, wherein the streamer is formed by a non-stretching and non-compressible inner tube and an outer tube that is coaxial with the inner tube and radially extensible, forming said integrated containers with the inner tube, and wherein the means of injection enable the injection of said liquid into the space between these two tubes so that it is possible to adjust the buoyancy of the streamer between a negative value at which it lies on the seafloor and a positive value at which it floats above this seafloor so that it can be shifted one measurement position to another.

2. A system according to claim 1, wherein the inert tail float communicates with the streamer so that it can receive a part of the liquid injected into it in order to modify its buoyancy in the same way as that of the streamer.

3. A system according to claim 2, wherein the interior of the tail float is divided into two compartments separated by a floating piston, a first compartment into which the liquid coming from the streamer penetrates and a second compartment linked to the depths of the sea to ensure the balance of the pressures.

4. A system according to claim 1, wherein the diver vehicle comprises a container of liquid and means to inject the liquid into the streamer and to retrieve it.

5. A system according to claim 4, wherein the interior of the diver vehicle is divided into two compartments separated by a floating piston, a first compartment comprising the liquid designed to be injected into the streamer and a second compartment linked to the depths of the sea to obtain the balancing of the pressures.

6. A system according to claim 1, wherein the streamer and the tail float are provided with guide ropes used to maintain the altitude of the assembly at a specified value above the seafloor when their buoyancy has become positive following the injection of the liquid.

7. A system according to claim 1, wherein the diver vehicle comprises means of navigation to make it maneuver in a horizontal plane so as to adjust the offset of the streamer with respect to the towing axis of the towing boat of the assembly.

8. A system according to claim 7, wherein these means of navigation comprise at least one propeller located in a cross-tunnel opening out on each of the side flanks of the diver vehicle.

9. A system according to claim 8, comprising a set of streamers designed to be towed in parallel and means of measurement to determine the distance between these streamers and control the navigation means of the diver vehicle accordingly.

10. A system according to claim 1, wherein the diver vehicle is provided with a keel enabling it to get firmly anchored to the seafloor.

11. A system according to claim 1, comprising a high-density module to enable strong mechanical coupling with the seafloor.

* * * * *